US012169409B2

(12) United States Patent
Miller et al.

(10) Patent No.: US 12,169,409 B2
(45) Date of Patent: Dec. 17, 2024

(54) AUTO-REVERSE CONTROL WITH NETWORK

(71) Applicant: Lindsay Corporation, Omaha, NE (US)

(72) Inventors: Mark William Miller, Elkhorn, NE (US); Luke Joseph Barker, Omaha, NE (US)

(73) Assignee: LINDSAY CORPORATION, Omaha, NE (US)

( * ) Notice: Subject to any disclaimer, the term of this patent is extended or adjusted under 35 U.S.C. 154(b) by 303 days.

(21) Appl. No.: 17/739,772

(22) Filed: May 9, 2022

(65) Prior Publication Data
US 2023/0359215 A1   Nov. 9, 2023

(51) Int. Cl.
G05D 1/00         (2024.01)

(52) U.S. Cl.
CPC ......... G05D 1/0229 (2013.01); G05D 1/0011 (2013.01)

(58) Field of Classification Search
CPC .......................... G05D 1/0229; G05D 1/0011
See application file for complete search history.

(56) References Cited

U.S. PATENT DOCUMENTS

| | | |
|---|---|---|
| 6,337,971 B1 | 1/2002 | Abts |
| 6,928,339 B2 | 8/2005 | Barker |
| 7,584,053 B2* | 9/2009 | Abts ...................... A01G 25/16 701/485 |
| 8,763,937 B2 | 7/2014 | Pfrenger et al. |
| 8,839,681 B2* | 9/2014 | Stewart ..................... G01F 1/52 73/861.78 |
| 8,948,979 B2* | 2/2015 | Malsam ................. A01G 25/16 701/52 |
| 10,098,291 B2 | 10/2018 | Andrews et al. |
| 10,517,237 B2* | 12/2019 | Miller ................. A01M 7/0089 |
| 10,568,278 B1 | 2/2020 | Klawinski |
| 10,893,650 B1* | 1/2021 | Sims .................... A01G 25/092 |
| 11,632,918 B2 | 4/2023 | Charling et al. |
| 2002/0107582 A1 | 8/2002 | Pollak et al. |
| 2014/0326808 A1 | 11/2014 | Malsam |
| 2015/0102136 A1* | 4/2015 | Malsam ................. A01G 25/16 239/731 |
| 2019/0369640 A1 | 12/2019 | He et al. |
| 2022/0039336 A1 | 2/2022 | Miller et al. |

OTHER PUBLICATIONS

International Search Report and Written Opinion in related PCT Application PCT/US2023/065446 mailed Aug. 7, 2023, 9 pages.

* cited by examiner

Primary Examiner — Stephen Holwerda
Assistant Examiner — Aaron G Cain
(74) Attorney, Agent, or Firm — HOVEY WILLIAMS LLP

(57) ABSTRACT

A mobile irrigation system including a number of spans, a number of mobile irrigation towers supporting the spans, and a control system. The control system includes a position switch configured to be triggered and transmit a trigger signal and a controller configured to receive the trigger signal from the position switch. Upon receiving the trigger signal, the controller is configured to determine whether a current position of the mobile irrigation system equates to an auto-reverse position. If the current position equates to the auto-reverse position, the controller is configured to transmit a reverse direction signal to a drive motor of one of the mobile irrigation towers to reverse direction so that the drive motor reverses direction.

16 Claims, 4 Drawing Sheets

AUTO-REVERSE CONTROL WITH NETWORK

BACKGROUND

Many mobile irrigation systems are controlled via simple switches and discrete status wires with the transfer of very limited information. Such mobile irrigation systems lack monitoring feedback so that it is difficult and sometimes impossible to ensure routine actions such as auto-reversals are successfully completed or performed properly.

Converting mobile irrigation systems into smart machines provides several benefits including monitoring feedback but is typically cost-prohibitive. Smart machines also greatly increase operation complexity, which can be overwhelming and an unattractive option to some farmers.

SUMMARY

Embodiments of the present invention solve the above-mentioned problems and other problems and provide a distinct advancement in the art of control systems for mobile irrigation systems. More particularly, the invention provides a mobile irrigation system that includes a control system that ensures auto-reversals are not performed prematurely and are actually completed successfully when properly initiated without necessitating costly and complicated smart machine upgrades or reconfigurations.

An embodiment of the invention is a mobile irrigation system broadly comprising a central pivot, a number of spans, and a control system. The control system directs drive motors to reverse direction only at designated auto-reverse positions and communicates with a remote user if a fault occurs or if auto-reversal fails. Although the mobile irrigation system is described as a center pivot irrigation system, linear irrigation systems and other mobile irrigation systems may be used.

The central pivot may be a tower, a standpipe, or the like. The central pivot may include a support structure for withstanding radial loads, axial loads, and twisting loads, a non-rotatable vertically extending pipe, and a rotatable elbow.

The spans include a number of truss sections, a number of conduit sections, and a number of mobile irrigation towers. Any number of spans may be used without departing from the scope of the present invention. To that point, spans may be added and removed as an area to be irrigated is increased or decreased.

Each truss section includes a number of beams rigidly connected to one another to form a framework which carries or otherwise supports the conduit sections and other fluid distribution mechanisms that are connected in fluid communication to the conduit. The truss sections may include braces, cross members, cables, and the like.

The conduit sections are connected end-to-end on the truss sections. The conduit sections transport water or other fluids to a number of sprinklers, spray guns, drop nozzles, or other fluid emitting devices spaced along the conduit sections.

Each of the mobile irrigation towers elevates adjacent truss sections and may include an "A-frame" or similar structure, a number of wheels, and a drive motor. Each mobile irrigation tower may also include a controller for activating its drive motor. One of the mobile irrigation towers may include a position switch configured to generate a trigger signal upon reaching an auto-reverse position.

The wheels may include conventional circular wheels, skis, skids, tank tracks and wheels, rollers on a track, or any mechanism on which the mobile irrigation towers may travel relative to the ground. In one embodiment, one of every pair of wheels is drivably connected to one of the drive motors and the other wheel is free-spinning.

The drive motors may be constant speed or variable speed electric motors. In some embodiments of the invention, the drive motors may include integral or external relays so they may be turned on, off, and/or reversed. The drive motors are drivably connected to one of the wheels via a drive train including a geared transmission, a variable gear ratio transmission, a continuously variable transmission (CVT), or the like.

The control system includes a number of controllers and a number of transceivers. One of the controllers may be a main central controller. The controllers are communicatively coupled locally with the drive motors and the position switch (which may be considered part of the control system). The control system is also communicatively coupled remotely with remote computing devices and remote servers.

In use, the mobile irrigation system traverses a field until the position switch is activated or otherwise transmits a trigger signal to the control system. At this point, it is unknown whether the trigger signal was generated in response to a legitimate trigger.

In case the trigger signal was generated in response to a legitimate trigger (and hence the mobile irrigation system should reverse direction) or an obstacle that would cause damage should the mobile irrigation system continue in the same direction, the mobile irrigation system is stopped.

A determination whether a current position of the mobile irrigation system (or a component thereof) equates to the auto-reverse position is made. A tolerance may be taken into account in making this determination. In other words, it may be determined whether the current position of the mobile irrigation system (or a component thereof) is within the tolerance of (and hence equates to) the auto-reverse position.

If the above determination is "no", the control system notifies a remote user that the mobile irrigation system has stopped at a position that is not the auto-reverse position. This may include transmitting a fault signal representing a notification that a fault has occurred. The notification may include a prompt for the remote user to implement or provide instructions for a corrective action.

The control system then receives a signal representing an instruction for a corrective action. The control system may then implement the corrective action.

If the above determination is "yes", the control system may start an auto-reverse command sequence. Specifically, one of the controllers may transmit a reverse direction signal to one of the drive motors representing an instruction to reverse direction so that the corresponding mobile irrigation tower reverses direction.

A determination whether the trigger signal has terminated indicating the auto-reverse is successful is then made. In making this determination, a debounce period may be applied to prevent false positives, false negatives, oscillating signals, imperfect signals, and the like. Alternatively, it may be determined whether a subsequent position of the mobile irrigation system indicates the auto-reverse action is successful.

If the above determination is "no", the remote user may be notified that the auto-reverse action has failed. The remote user may also be prompted for a corrective action.

The notification and prompt may be made via a signal transmitted to the remote user.

The control system may also receive from the remote user a signal representing a corrective action. The control system may then implement the corrective action.

If the above determination is "yes", the mobile irrigation system has successfully completed the auto-reverse action. The control system may then transmit a notification to the remote user that the auto-reverse action has been successfully completed.

The above-described mobile irrigation system and control system provides several advantages. For example, the control system ensures auto-reversals are preformed properly. More specifically, the control system ensures auto-reversals are not initiated pre-maturely and that auto-reversals initiated properly are successfully completed. The control system also prompts and responds to remote user commands so that farmers can assist in control of the mobile irrigation system as needed without having to be onsite and without being subjected to the complexity of smart machine control systems.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
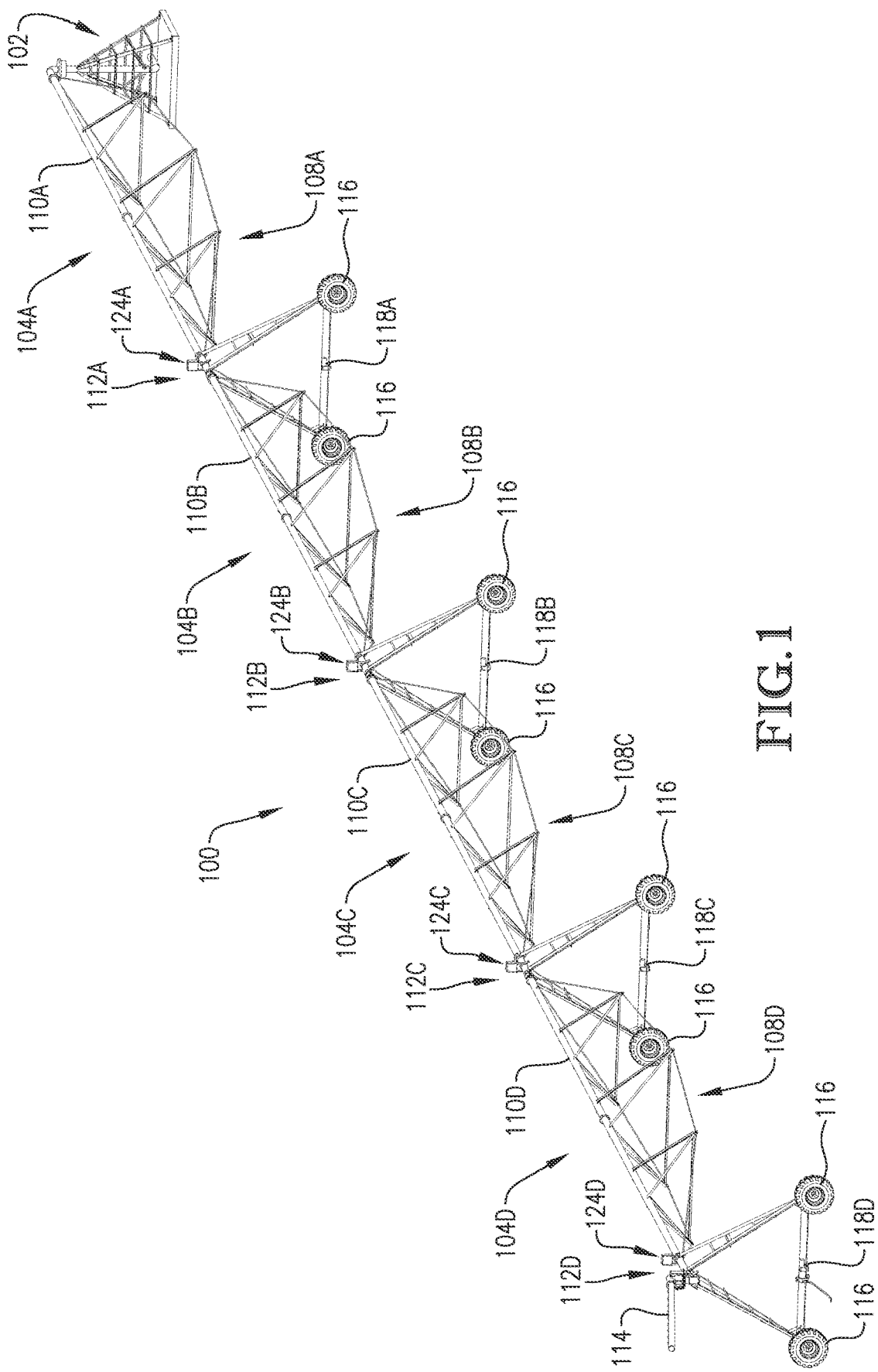
FIG. 1 is a perspective view of a mobile irrigation system constructed in accordance with an embodiment of the invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the drawing figures, a mobile irrigation system 100 constructed in accordance with various embodiments of the invention is illustrated. The mobile irrigation system 100 is a central pivot irrigation system broadly comprising a central pivot 102, a plurality of spans 104A-D, and a control system 106. Other irrigation systems such as linear move irrigation systems may also be used without departing from the scope of the invention.

The central pivot 102 distributes water or other fluids to the spans 104A-D and may be a tower, a standpipe, or the like. The central pivot 102 may include a support structure for withstanding radial loads, axial loads, and twisting loads, a non-rotatable vertically extending pipe, and a rotatable elbow. The non-rotatable vertically extending pipe carries the fluids to an elevated height. The rotatable elbow connects the first span 104A to the non-rotatable vertically extending pipe such that the spans 104A-D are free to pivot about the central pivot 102 while remaining connected thereto.

The plurality of spans 104A-D include a plurality of truss sections 108A-D, a plurality of conduit sections 110A-D, and a plurality of mobile irrigation towers 112A-D. Any number of spans may be used without departing from the scope of the present invention. To that point, spans may be added and removed as an area to be irrigated is increased or decreased. The outermost span (in this case span 104D) may include an end gun 114 configured to spray water radially outwardly to increase a total irrigation area of the mobile irrigation system 100.

Each of the truss sections 108A-D provides rigidity to or otherwise supports one of the conduit sections 110A-D. The truss sections 108A-D may include braces, cross members, cables, and the like.

Each of the conduit sections 110A-D transport water or other fluids to a plurality of sprinklers, spray guns, drop nozzles, or other fluid emitting devices spaced along the conduit sections 110A-D to apply water and/or other fluids to areas underneath the irrigation system 100. The conduit sections 110A-D may be or may include metal pipes and flexible liners including outlets to which the fluid emitting devices are connected. The outermost conduit section (in this case conduit section 110D) may be fluidly connected to the end gun 114 for delivering water or other fluids thereto.

Each of the mobile irrigation towers 112A-D elevates adjacent truss sections 108A-D and may include an "A-frame" or similar structure, a number of wheels 116, and a drive motor 118A-D. Each mobile irrigation tower 112A-D may also include a controller for activating the drive motor 118A-D according to a position of the mobile irrigation tower 112A-D or a relative angle of the adjacent span 104A-D, as described in more detail below. Some of all of the mobile irrigation towers (such as mobile irrigation tower 112D in this embodiment) may also include a position switch 120, shown in FIG. 2.

The position switch 120 may be mounted on one of the mobile irrigation towers 112D and may be configured to contact a target 122. To that end, the position switch 120 may be positioned at a low point such as on a crossbeam between two wheels 116 for engaging the target 122. The position switch 120 may also be considered part of the control system 106.

The target 122 may be positioned in the field near a position in which reversal of the mobile irrigation system 100 is desired for being engaged by the position switch 120. For example, the target 122 may be positioned near the end of a field, near the end of a rotational range of the mobile irrigation system 100, or near the end of an irrigation region.

The wheels 116 illustrated and described herein are merely examples of mechanisms for permitting movement of the mobile irrigation system 100. The term "wheel" or "wheels" as used herein may refer to conventional circular wheels, skis, skids, tank tracks and wheels, rollers on a track, or any mechanism on which the mobile irrigation towers may travel relative to the ground. In one embodiment, each mobile irrigation tower 112A-D includes a pair of wheels with one wheel being drivably connected to one of the drive motors 118A-D and the other wheel free-spinning.

The drive motors 118A-D are substantially similar, so only drive motor 118D will be described further. The drive motor 118D may be a constant speed or variable speed electric motor. In some embodiments of the invention, the drive motor 118D may include integral or external relays so they may be turned on, off, and/or reversed. The drive motor 118D may be drivably connected to one of the wheels 116 via a drive train including a geared transmission, a variable gear ratio transmission, a continuously variable transmission (CVT), or the like.

The control system 106 includes a plurality of controllers 124A-D and a plurality of transceivers 126A-D. The control system 106 may be communicatively coupled with the plurality of motors 118A-D and the position switch 120, remote computing devices such as remote device 130, and remote servers such as server 132.

The plurality of controllers 124A-D are substantially similar so only controller 120D will be described in detail. Controller 124D may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The controller 124D may generally execute, process, or run instructions, code, code segments, code statements, software, firmware, programs, applications, apps, processes, services, daemons, or the like. The controller 124D may also include hardware components such as registers, finite-state machines, sequential and combinational logic, configurable logic blocks, and other electronic circuits that can perform the functions necessary for the operation of the current invention. In certain embodiments, the controller 124D may include multiple computational components and functional blocks that are packaged separately but function as a single unit. The controller 124D may be in electronic communication with the other electronic components through serial or parallel links that include universal busses, address busses, data busses, control lines, and the like.

The controller 124D may include, perhaps as an embedded device or an integrated device, or be in electronic communication with, a memory element. The memory element may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the controller. The memory element may include, or may constitute, a non-transitory "computer-readable medium". The memory element may store the instructions, code, code statements, code segments, software, firmware, programs, applications, apps, services, daemons, or the like that are executed by the controller. The memory element may also store data that is received by the controller 124D or the device in which the controller 124D is implemented. The memory element may further store data or intermediate results generated during processing, calculations, and/or computations as well as data or final results after processing, calculations, and/or computations. In addition, the memory element may store settings, data, documents, sound files, photographs, movies, images, databases, and the like.

Figure 2:
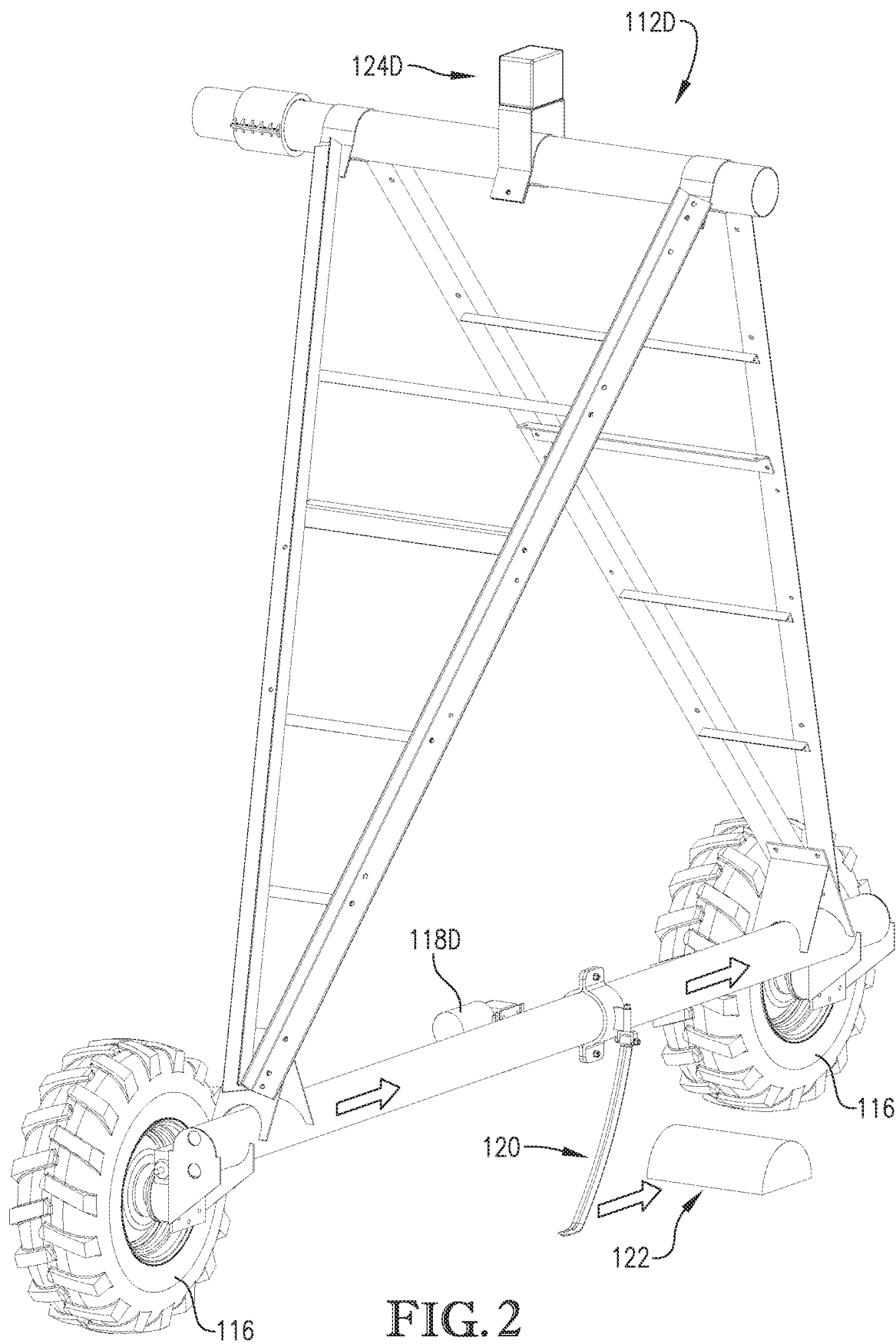
FIG. 2 is an enlarged perspective view of certain components of the mobile irrigation system of FIG. 1.
Figure 3:
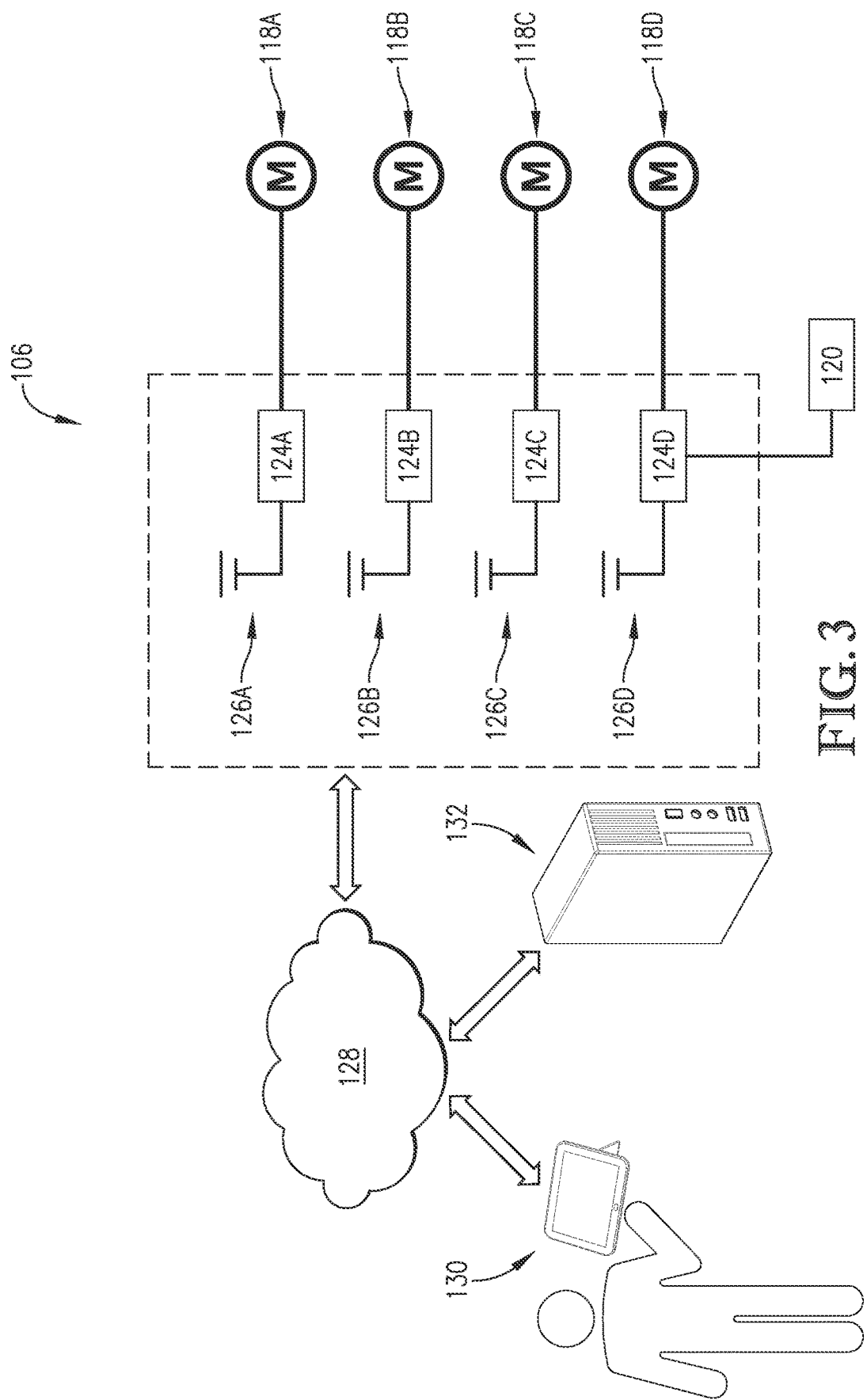
FIG. 3 is a schematic diagram of a cantrol system of the mobile irrigation system of FIG. 1.
Figure 4:
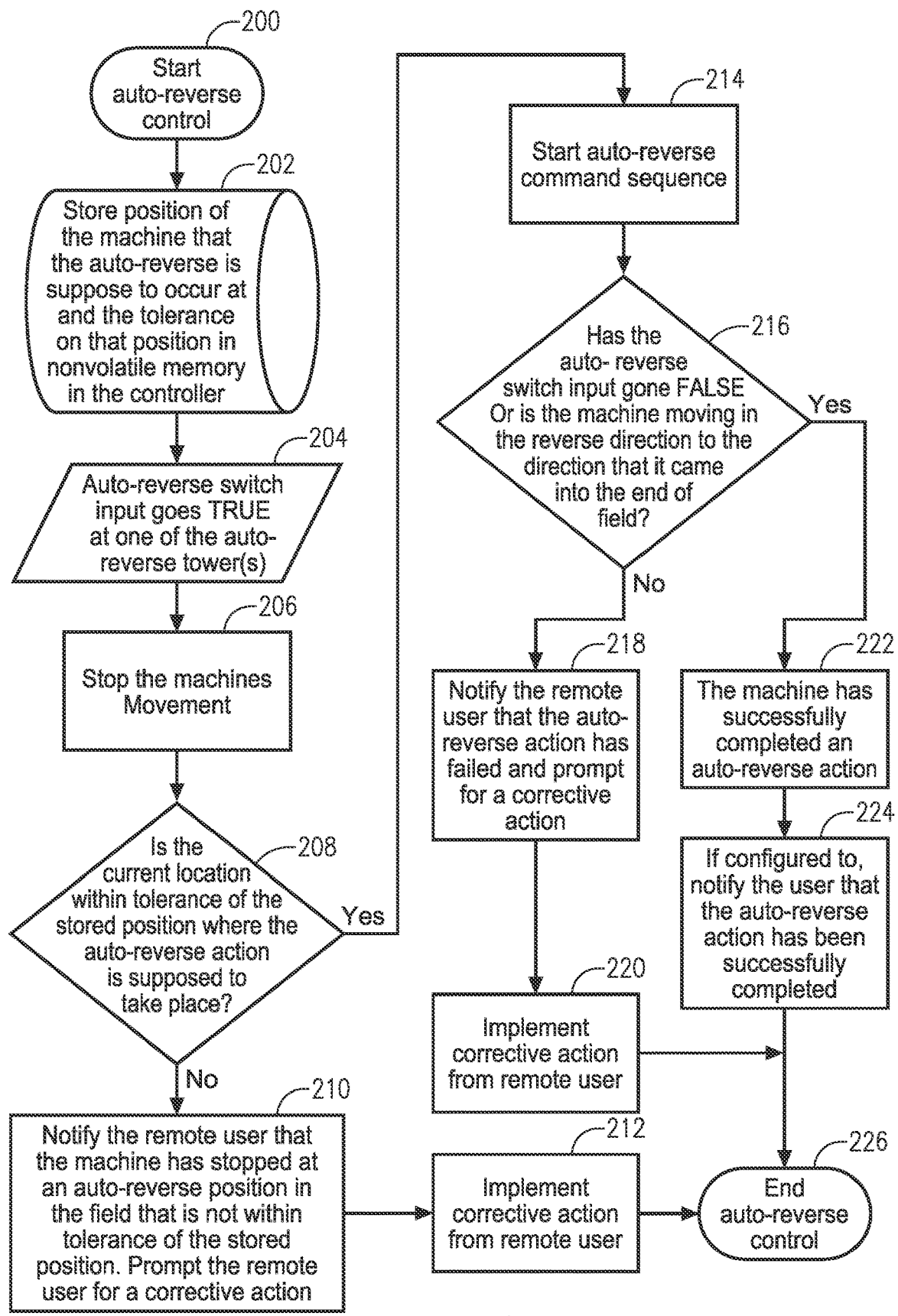
FIG. 4 is a flow diagram including certain method steps of auto-reverse control of the mobile irrigation system of Fla 1.

Each of the plurality of controllers 124A-D may be mounted on or near one of the mobile irrigation towers 122A-D, as shown in FIG. 1, For example, controller 124D may be mounted on mobile irrigation tower 122D, as shown in FIG. 2. The plurality of controllers 124A-D may include or may be communicatively connected to a main central controller, with the remaining controllers being distributed controllers.

The plurality of controllers 124A-D may be communicatively coupled with each other via a wired or wireless data bus such as a CAN bus, Mod bus, ethernet, ethernet over powerline, ethernet over fiber, or any other data bus style type protocol. Additionally, communication between distributed controllers and the main central controller may occur over a cloud network (e.g., network 128). The plurality of controllers 124A-D may also utilize edge computing, an Internet of Things (IoT) system, machine-to-machine (M2M) communication, and other computing and communication paradigms. For example, the controllers 124 may communicate with nearby agricultural implements for improved, more responsive, or more comprehensive computing and data storage.

Each of the transceivers 126A-D may include signal and/or data transmitting and receiving circuits, such as antennas, amplifiers, filters, mixers, oscillators, digital signal processors (DSPs), and the like. The transceivers 126A-D may establish communication with each other and with remote computing devices wirelessly by utilizing radio frequency (RF) signals and/or data that comply with communication standards such as cellular 2G, 3G, 4G, Voice over Internet Protocol (VoIP), LTE, Voice over LTE (VoLTE), or 5G, Institute of Electrical and Electronics Engineers (IEEE) 802.11 standard such as WiFi, IEEE 802.16 standard such as WiMAX, Bluetooth™, or combinations thereof.

The control system 106 may implement a wired or wireless network that communicatively connects all of the controllers 124A-D and other devices. For example, the controllers 124A-D, position switch 120, and drive motors 118A-D may be communicatively connected via hard wires, fibers, a radio frequency network, or any combination thereof. The control system 106 may also communicate with the remote device 130 and remote server 132 via cellular radios, a radio frequency network, satellite radio, hard wiring, or any other suitable communication connection.

The remote device 130 may be a mobile cellular phone, a tablet, a laptop, a desktop computer, a personal digital assistant, a pager, or the like. The remote device 130 may be used by a remote user to receive notifications and prompts from the control system 106 and to transmit commands, data, and information to the control system 106.

The remote server 132 may be a desktop computer, a server, a backend computer, or any other suitable computing device. The remote server 132 may be used for data collection and storage associated with the mobile irrigation system 100 and additional computing power for the control system 106 and remote device 130.

Use of the mobile irrigation system 100 will now be described in more detail. First, auto-reverse control may be implemented or activated, as shown in block 200. This may be automatic with general operation of the mobile irrigation system 100 or may be done selectively.

A position at which auto-reverse of the mobile irrigation system 100 should occur may then be stored in memory, as shown in block 202. The position may be an angular position of a span, a distance a span is from the end of a run or the beginning of a run, a discrete latitude or longitude point, or any other type of position.

A tolerance associated with the position may also be stored in memory. The tolerance may depend on the type of position. For example, the tolerance may be an angular tolerance, a linear tolerance, a tolerance radius, or any other suitable tolerance.

The mobile irrigation system 100 may then traverse a field until the position switch 120 is activated or otherwise transmits a trigger signal to the control system 106, as shown in block 204. Importantly, at this point, it is unknown whether the trigger signal was generated in response to a legitimate trigger.

In case the trigger signal was generated in response to a legitimate trigger (and hence the mobile irrigation system 100 should reverse direction) or an obstacle that would cause damage should the mobile irrigation system 100 continue in the same direction, the mobile irrigation system 100 may be stopped, as shown in block 206. This may include one of the controllers 122A-D transmitting a stop signal to one of the drive motors 116A-D representing an instruction to stop in response to receipt of the trigger signal. The control system 106 may also pause at the end of the field (or at the intended reverse position) to irrigate in place prior to reversing.

A decision may then be made at block 208. Specifically, it may be determined whether a current position of the mobile irrigation system 100 (or a component thereof) equates to the auto-reverse position. The tolerance may be taken into account in making this determination. In other words, it may be determined whether the current position of the mobile irrigation system 100 (or a component thereof) is within the tolerance of (and hence equates to) the auto-reverse position. The current position may be an angular position of a span, a distance a span is from the end of a run or the beginning of a run, a discrete latitude or longitude point, or any other type of position.

If the above determination is "no", the control system 106 may notify a remote user that the mobile irrigation system 100 has stopped at a position that is not the auto-reverse position, as shown in block 210. This may include transmitting a fault signal representing a notification that a fault has occurred. The notification may include a prompt for the remote user to implement or provide instructions for a corrective action.

The control system 106 may then receive a signal representing an instruction for a corrective action. The control system 106 may then implement the corrective action, as shown in block 212.

If the determination at block 208 is "yes", the control system 106 may start an auto-reverse command sequence, as shown in block 214. Specifically, one of the controllers 122A-D may transmit a reverse direction signal to one of the drive motors 116A representing an instruction to reverse direction so that the corresponding mobile irrigation tower 112A-D reverses direction.

A decision may then be made at block 216. Specifically, it may be determined whether the trigger signal has terminated indicating the auto-reverse is successful. In making this determination, a debounce period may be applied to prevent false positives, false negatives, oscillating signals, imperfect signals, and the like. Alternatively, it may be determined whether a subsequent position of the mobile irrigation system 100 indicates the auto-reverse action is successful. The subsequent position may be an angular position of a span (as determined by an encoder on the mobile irrigation system 100 for example), a distance a span is from the end of a run or the beginning of a run, a discrete latitude or longitude point (as determined by GPS or other means), or any other type of position.

If the above determination is "no", the remote user may be notified that the auto-reverse action has failed, as shown in block 218. The remote user may also be prompted for a corrective action. The notification and prompt may be made via a signal transmitted to the remote user.

The control system 106 may also receive from the remote user a signal representing a corrective action. The control system 106 may then implement the corrective action, as shown in block 220. Corrective actions may be continuing movement as previously commanded, stopping movement and waiting for another command from the remote user, or any other suitable corrective action.

If the determination at block 216 is "yes", the mobile irrigation system 100 has successfully completed the auto-reverse action, as shown in block 222. The control system 106 may then transmit a notification to the remote user that the auto-reverse action has been successfully completed, as shown in block 224.

After a corrective action has been implemented (block 212 or 220) or after the auto-reverse action has been successfully completed, the auto-reverse control may then end, as shown in block 226. Auto-reverse control may be active or on standby at any time or may be turned off for certain situations.

Control parameters, values, and other data may be changed via instructions received from the remote computing device 130, remote server 132, edge computing devices, or IoT devices, or from direct inputs into the controllers 124A-D. For example, an input signal representing a change to the auto-reverse position or tolerance may be received. The auto-reverse position or tolerance stored in the memory may then be updated according to the input signal.

Some or all of the above features and steps can be performed by a single controller, via a number of controllers together (e.g., controllers 124A-D), at a central or edge control location, or remotely from the mobile irrigation system 100. Some or all of the above features and steps can be applied to any one or all of the mobile irrigation towers 112A-D, although the outermost mobile irrigation tower 112D may be predominantly utilized as it covers the most area and is the most effective for implementing control of the mobile irrigation system 100.

The above-described mobile irrigation system 100 and control system 106 provides several advantages. For example, the control system 106 ensures auto-reversals are preformed properly. More specifically, the control system 106 ensures auto-reversals are not initiated pre-maturely and that auto-reversals initiated properly are successfully completed. The control system 106 also prompts and responds to remote user commands so that farmers can assist in control of the mobile irrigation system 100 as needed without having to be onsite and without being subjected to the complexity of smart machine control systems, Additional Considerations Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 110(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A control system for a mobile irrigation system, the mobile irrigation system including a span having a mobile irrigation tower driven by a drive motor, the control system comprising:
a position switch configured to be triggered and transmit a trigger signal;
a controller configured to:
receive the trigger signal from the position switch;
upon receiving the trigger signal, determine whether a current position of the mobile irrigation system equates to an auto-reverse position;
transmit a reverse direction signal to the drive motor representing an instruction to reverse direction if the current position equates to the auto-reverse position so that the drive motor reverses direction,
each of the current position and the auto-reverse position being at least one of an angular position of the span, a distance the span is from the end of a run or the beginning of a run, and a discrete latitude or longitude point,
wherein the auto-reverse position includes a tolerance including at least one of an angular tolerance, a linear tolerance, and a tolerance radius; and
a memory configured to store the tolerance, the controller being further configured to receive an input signal representing a change to the tolerance.

2. The control system of claim 1, the control system being further configured to, upon receipt of the trigger signal, transmit a stop signal to the drive motor representing an instruction to stop.

3. The control system of claim 1, further comprising a transceiver communicatively coupled with the controller, the controller being further configured to, if the current position of the mobile irrigation system does not equate to the auto-reverse position, transmit a fault signal representing a notification that a fault has occurred via the transceiver.

4. The control system of claim 3, the controller being further configured to receive via the transceiver a signal representing an instruction for corrective action and generate a signal representing a corrective action.

5. The control system of claim 1, the controller being further configured to, upon transmitting the reverse direction signal, determine whether the trigger signal has terminated indicating the auto-reverse is successful and if so, transmit a signal representing a notification that the auto-reverse is successful via the transceiver.

6. The control system of claim 5, wherein the determination whether the trigger signal has terminated includes applying a debounce period.

7. The control system of claim 1, the controller being further configured to, upon transmitting the reverse direction signal, determine whether a subsequent position of the mobile irrigation system indicates the auto-reverse is successful and if so, transmit a signal representing a notification that the auto-reverse is successful via the transceiver.

8. The control system of claim 7, the subsequent position being at least one of an angular position of the span, a distance the span is from the end of a run or the beginning of a run, and a discrete latitude and longitude point.

9. The control system of claim 3, upon transmitting the reverse direction signal, the controller being further configured to:
determine whether the trigger signal has terminated indicating the auto-reverse is successful; and
if the trigger signal has not terminated indicating the auto-reverse is unsuccessful:
transmit a signal representing a notification that auto-reverse is unsuccessful and a prompt for corrective action via the transceiver;
receive via the transceiver a signal representing an instruction for corrective action; and
generate a signal representing a corrective action.

10. The control system of claim 1, the memory being further configured to store the auto-reverse position, the controller being further configured to receive an input signal representing a change to the auto-reverse position.

11. The control system of claim 1, wherein the controller is further configured to communicate with a remote device via a machine-to-machine communication system.

12. A mobile irrigation system comprising:
a center pivot;
a plurality of spans connected in series from the center pivot, each of the plurality of spans including:
a conduit section configured to transport an irrigation fluid from a fluid source to a field;
a truss structure configured to support the conduit section; and a mobile irrigation tower configured to move the truss structure and the conduit section across the field, the mobile irrigation tower including:
  a plurality of wheels for traversing the field; and
  a drive motor drivably connected to one of the plurality of wheels; and
a control system mounted on the mobile irrigation system, the control system comprising:
  a position switch configured to be triggered and transmit a trigger signal;
  a controller configured to:
    receive the trigger signal from the position switch;
    upon receiving the trigger signal, determine whether a current position of the mobile irrigation system equates to an auto-reverse position; and
    transmit a reverse direction signal to the drive motor representing an instruction to reverse direction if the current position equates to the auto-reverse position so that the drive motor reverses direction, each of the current position and the auto-reverse position being at least one of an angular position of the span, a distance the span is from the end of a run or the beginning of a run, and a discrete latitude or longitude point,
    wherein the auto-reverse position includes a tolerance including at least one of an angular tolerance, a linear tolerance, and a tolerance radius; and
  a memory configured to store the tolerance, the controller being further configured to receive an input signal representing a change to the tolerance.

13. The mobile irrigation system of claim 12, the control system further comprising a transceiver communicatively coupled with the controller, the controller being further configured to, if the current position of the mobile irrigation system does not equate to the auto-reverse position, transmit via the transceiver a fault signal representing a notification that a fault has occurred, receive a signal representing an instruction for corrective action via the transceiver, and generate a signal representing a corrective action.

14. The mobile irrigation system of claim 12, the controller being further configured to, upon transmitting the reverse direction signal, determine whether the trigger signal has terminated indicating the auto-reverse is successful and if so, transmit a signal representing a notification that the auto-reverse is successful via the transceiver.

15. The mobile irrigation system of claim 12, the controller being further configured to, upon transmitting the reverse direction signal, determine whether a subsequent position of the mobile irrigation system indicates the auto-reverse is successful and if so, transmit a signal representing a notification that the auto-reverse is successful via the transceiver.

16. A mobile irrigation system comprising:
a center pivot;
a plurality of spans connected in series from the center pivot, each of the plurality of spans including:
  a conduit section configured to transport an irrigation fluid from a fluid source to a field;
  a truss structure configured to support the conduit section; and
  a mobile irrigation tower configured to move the truss structure and the conduit section across the field, the mobile irrigation tower including:
    a plurality of wheels for traversing the field; and
    a drive motor drivably connected to one of the plurality of wheels; and
a control system mounted on the mobile irrigation system, the control system comprising:
  a position switch configured to be triggered and transmit a trigger signal;
  a transceiver configured to transmit and receive signals;
  a memory configured to store an auto-reverse position including a tolerance including at least one of an angular tolerance, a linear tolerance, and a tolerance radius; and
  a controller communicatively coupled with the position switch and the transceiver, the controller being configured to:
    receive an input signal representing a change to the tolerance;
    receive an input signal representing a change to the auto-reverse position;
    change the auto-reverse position according to the input signal;
    receive the trigger signal from the position switch;
    upon receiving the trigger signal, determine whether a current position of the mobile irrigation system equates to the auto-reverse position;
    if the current position of the mobile irrigation system does not equate to the auto-reverse position, transmit via the transceiver a fault signal representing a notification that a fault has occurred, receive a signal representing an instruction for corrective action via the transceiver, and generate a signal representing a corrective action; and
    transmit a reverse direction signal to the drive motor representing an instruction to reverse direction if the current position equates to an auto-reverse position so that the drive motor reverses direction,
    the controller being further configured to communicate with a remote device via a machine-to-machine communication system.

* * * * *